H. DOCK.
CLUTCH MECHANISM.
APPLICATION FILED JAN. 9, 1908.

901,081.

Patented Oct. 13, 1908.

2 SHEETS—SHEET 1.

Witnesses:

Inventor.
HERMAN DOCK
By his Attorneys

H. DOCK.
CLUTCH MECHANISM.
APPLICATION FILED JAN. 9, 1908.
901,081.
Patented Oct. 13, 1908.
2 SHEETS—SHEET 2.
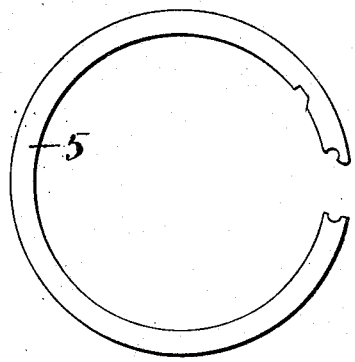
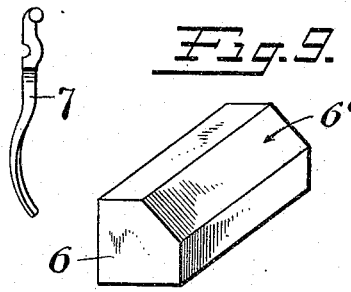
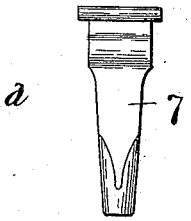
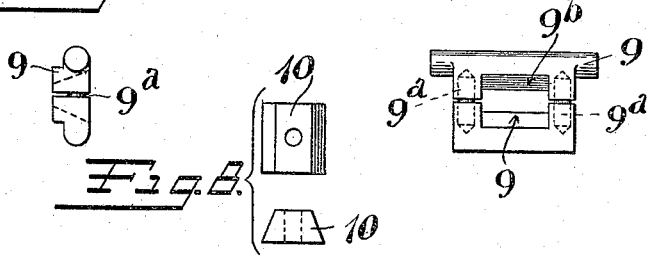
Witnesses:
Inventor
HERMAN DOCK
By his Attorneys

UNITED STATES PATENT OFFICE.

HERMAN DOCK, OF WESTERLY, RHODE ISLAND, ASSIGNOR TO DOCK GAS ENGINE COMPANY, OF NEW YORK, N. Y., A CORPORATION OF NEW JERSEY.

CLUTCH MECHANISM.

No. 901,081.     Specification of Letters Patent.     Patented Oct. 13, 1908.

Application filed January 9, 1908. Serial No. 410,007.

*To all whom it may concern:*

Be it known that I, HERMAN DOCK, a citizen of the United States, residing at Westerly, Washington county, Rhode Island, have invented certain new and useful Improvements in Clutch Mechanism, of which the following is a full, clear, and exact description.

My invention relates to improvements in clutch mechanism.

The object of the invention is to provide certain features of improvement in the construction of that type of clutch termed "expansion ring clutch," whereby the ring member is caused, when in the active clutching position, to engage with the clutched member uniformly throughout its entire length.

Another feature of improvement resides in the provision of means whereby the operating mechanism may be readily taken up to compensate for wear.

Figure 1:
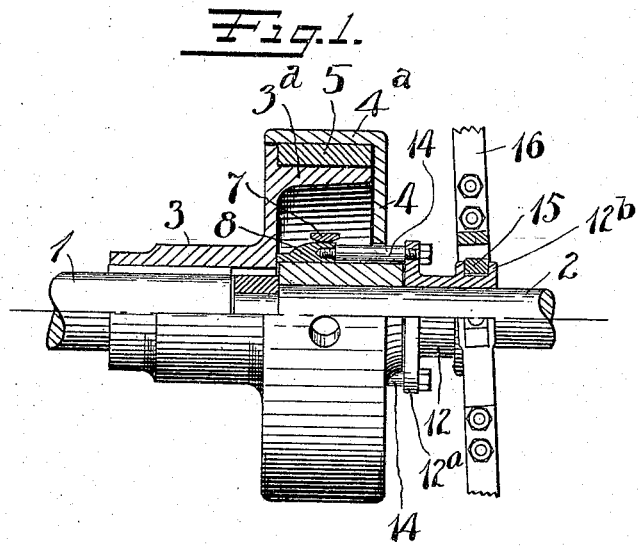
Figure 2:
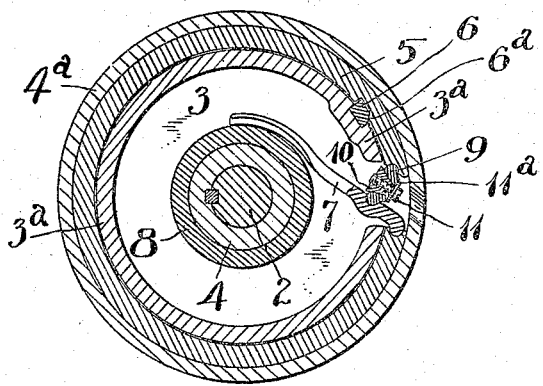

In the accompanying drawings, Figure 1 is a side elevation, the upper half of the clutch mechanism being shown in section. Fig. 2 is a central vertical section through the clutch. Fig. 3 is a side elevation of the clutch ring. Fig. 4 is an edge view of the ring-expanding lever. Fig. 5 is a front elevation or plan thereof. Fig. 6 is an edge view of an adjustable coupling between the ring-expanding lever and the ring. Fig. 7 is a front view or plan thereof. Fig. 8 illustrates a plan and end view of an adjusting device. Fig. 9 is a relatively enlarged perspective view of a detail.

1 may represent a driving shaft, 2 a driven shaft.

3 is a frame or bracket keyed upon the shaft 1.

4 is a frame or bracket keyed upon the shaft 2, the hub of this bracket 4 projecting well up to the frame 3, as best seen in Fig. 1. The frame or bracket 3 has a flanged extension $3^a$ which forms an annular support for the clutch ring 5. The frame or bracket 4 has an annular projecting flange $4^a$ which overstands the clutch-ring 5.

6 is a keeper or key set into or carried by the flange $3^a$, a portion of said keeper or key projecting into a recess on the inner side of the ring 5 (see Fig. 2). As will be observed, the clutch ring 5 is not complete, but is divided so that it may be expanded. The key 6 is located close to one end of the ring 5, which I will term the restrained end. That side of the key facing the adjacent extremity of the clutch ring 5 is beveled off, as indicated at $6^a$. The adjacent wall of the recess in the ring in which the key 6 stands is preferably likewise shaped to said bevel. A suitable clearance space is provided at one side of the flange $3^a$ to permit the passage therethrough of the ring-actuating lever 7. The outer end of the lever 7 has a bearing against the unrestrained end of the ring 5, as best seen in Fig. 2. The other end of said lever 7 rests upon the cam ring 8, which is slidable upon the hub of the bracket 4. When the cam ring is in one position, the inner end of the lever 7 will lie closer to the axis of the shaft 2 than when said cam ring is in another position. Therefore, by shifting the cam ring forward and back, the lever 7 may be rocked. Interposed between the lever 7 and the restrained end of the clutch ring 5 is a coupling block 9, which, in its preferable form, is adjustable, whereby wear may be taken up. In this preferred form, the block comprises two expansible members mounted on and connected by guide pins $9^a$ (Fig. 7) which guarantee the correct alinement of said parts. The adjacent inner faces of the two pieces constituting the block 9 are oppositely beveled, as indicated at $9^b$, and located in the space between these beveled faces is a wedge member 10, which is arranged to coact with the inclined surface $9^b$.

11 is an adjusting screw provided with a suitable washer or support $11^a$, which rests upon the side of the block 9 opposite the wedge 10 (see Fig. 2). Now, by setting up on the screw 11, the wedge 10 may be drawn in so as to spread the two members of the block 9 apart.

To move the cam ring 8, any suitable means may be provided, although I prefer to employ a sliding sleeve 12 on the shaft 2. This slide may have a flange or offset $12^a$. 14—14 are rods projecting through guide passages in the frame or bracket 4, and connected at their inner ends to the cam ring 8. The slide 12 may be provided with a collar $12^b$, in which a ring 15 is loosely mounted, said ring being connected to a swinging hand-operated lever 16.

The end of the lever 7, which takes a bearing against one end of the clutch ring 5, should preferably be rounded and a corresponding recess should be formed in the end of the ring. So also rounded recesses should be formed in the opposite end of the ring and in the side of the lever to receive the rounded ends of the block 9. The bearing of the block 9 against the lever 7 may be as close to the fulcrum of the lever as desired, so as to get, by a slight application of pressure on lever 16, a powerful expanding action of the clutch ring.

In operation, the swinging of the lever 16 to and fro will advance or retract the cam ring and will expand ring 5, or permit it to contract. It should be understood that the ring 5 is so constructed that when its ends are released it will preferably contract so as to free itself from the flange $4^a$, at which time the shafts 1 and 2 will be uncoupled. When it is desired to couple the same, the cam ring 8 is pushed in, swinging lever 7 in a direction to apply its force against both ends of the clutch ring 5. If the key 6 made a square connection with the ring 5, there would be no tendency to expand that end of the ring, but instead the whole expansion would occur at or near the unrestrained end of the ring, with the result that the greatest wear would be on one side of said ring. To secure uniform wear, I have provided the bevel $6^a$, so that when the ring is expanded both ends thereof will actually move apart and outwardly, thereby causing the entire clutching surface of the ring 5 to press with substantial uniformity throughout its entire length against the flange $4^a$, as indicated in Figs. 1 and 2. The flange $4^a$ is preferably perforated at one point to give access to screw 11, so that by means of a screw-driver the user may readily adjust the clutch to the desired tension or may readjust the clutch at any time to take up wear. As will be seen, the end of the lever 7 and the coupling block 9 form two toggle links.

It should be understood that I have shown the invention only in the preferred form, appreciating that many changes may be made without destroying the identity of the same.

What I claim is:

1. In a clutch, a divided clutch ring, a support and anchorage therefor, means cooperating with both ends of said ring to expand the same, said ring anchorage having an inclined bearing for said ring on that side adjacent to the operating means.

2. In a clutch, a divided clutch ring, a support, an anchorage therefor, means cooperating with both ends of the ring to move the same apart, said ring anchorage having a beveled bearing on that side of said ring adjacent to the operating means to cause the restrained end of the ring to expand radially as both ends of the ring are moved apart.

3. In a clutch, a divided clutch ring, a support therefor, an anchorage near one end of the ring and carried by said support, one side of said anchorage being beveled, means directly engaging both ends of the ring to expand the same, said ring riding up said beveled side of said anchorage during the act of expansion.

4. In a clutch, a divided clutch ring, a support therefor, an anchorage for said ring on said support and near one end of said ring, means to move both ends of said ring apart and comprising two toggle links, adjustable means for one of said links including a screw-controlled wedge, an operating cam for said toggle links.

5. In a clutch, a divided clutch ring, a support therefor, an anchorage for said ring, one side of said anchorage having a square wall at one side and a beveled wall at the opposite side to form an incline up which the adjacent part of the ring may ride, and means to move apart both ends of said ring, said means being adjacent to the inclined wall of said anchorage.

6. In a clutch, a divided clutch ring, a support therefor, an anchorage for one end of said ring, one wall of said anchorage being beveled to form an incline, a corresponding incline on the ring adjacent thereto, and means adjacent to said inclined wall of the anchorage to move apart both ends of said ring, including adjustable mechanism to vary the operative throw of said means.

HERMAN DOCK.

Witnesses:
WILLIAM H. RUEF,
GEO. H. OLNEY.